US012101303B2

(12) United States Patent
    Jayaraman (10) Patent No.: US 12,101,303 B2
(45) Date of Patent: Sep. 24, 2024

(54) SECURE PACKET RECORD IN MULTI-SOURCE VR ENVIRONMENT

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 203 days.

(21) Appl. No.: 18/051,919

(22) Filed: Nov. 2, 2022

(65) Prior Publication Data
    US 2024/0146699 A1    May 2, 2024

(51) Int. Cl.
    *H04L 9/40*     (2022.01)
    *G06T 17/00*    (2006.01)

(52) U.S. Cl.
    CPC .......... *H04L 63/0428* (2013.01); *G06T 17/00* (2013.01); *H04L 63/0272* (2013.01); *H04L 63/083* (2013.01); *H04L 63/0861* (2013.01); *G06T 2200/24* (2013.01)

(58) Field of Classification Search
    CPC ............... H04L 63/083; H04L 63/0272; H04L 63/0428; H04L 63/0861; G06T 2200/24; G06T 17/00
    See application file for complete search history.

(56) References Cited

U.S. PATENT DOCUMENTS

| | | | |
|---|---|---|---|
| 10,002,337 B2 * | 6/2018 | Siddique | G06Q 30/0601 |
| 10,203,762 B2 * | 2/2019 | Bradski | H04N 21/414 |
| 2023/0370508 A1 * | 11/2023 | Miller | G06F 3/017 |

\* cited by examiner

*Primary Examiner* — Benjamin A Kaplan
(74) *Attorney, Agent, or Firm* — Michael A. Springs, Esq.; Shumaker, Loop & Kendrick, LLP; Patrick B. Horne (57) ABSTRACT

A system for secure packet recordation in multisource virtual environments includes: a computing system having one or more processor and a network connection for operatively connecting the computing system to a modeling server providing a geometric model. The computing system, upon user navigation action directed to the first modeling server, accesses the first geometric model and causes display a three dimensional virtual environment based. An asset indicium representing a virtual asset of the user and a graphical representation of a secure packet are displayed. Upon a deposit request by the user, the first virtual asset is received into the secure packet. Upon user navigation directed away from the first modeling server, display of the three dimensional virtual environment is terminated, for example as a user explores another environment. In the absence of user attention, a content record is maintained including tabulation of at least the first virtual asset.

20 Claims, 6 Drawing Sheets

SECURE PACKET RECORD IN MULTI-SOURCE VR ENVIRONMENT

FIELD

This invention relates generally to the field of asset security, and, more particularly, embodiments of the invention relate to virtual asset security in multi-source virtual environments.

BACKGROUND

The creation of the internet is generally credited to universities and their activities in interconnecting once disparate computer networks to facilitate collaborations in research. What began as a means for researchers and students to share data, code, and processing time, evolved into a widespread connection platform for people of all walks. While early email exchanges and shared communication threads were likely focused on academic pursuits, human nature broadly repurposed those and other evolving communication means to serve every human interest and even whim. The internet now connects, informs, and entertains people the world over.

As computing power evolves, with reference to the processing powers of handheld devices, home-based computers, portable machines such as laptops, and to cloud-computing as well, users are seeking out immersive and at least visually realistic experiences. Akin to the broad purposing of the internet as it developed, uses for the potentially broad space of what is being called the metaverse, which is essentially conducted across the internet, are likely to expand across all human interests. The concept and future of the metaverse go far beyond just a nominal re-terming of the same space now called the internet. A virtual and multi-purpose space is being constructed that is undeniably navigable by humans via computing devices.

Users develop alter-egos, heroic versions of themselves, and context-specific characters they control in gaming and other virtual environments. These user-representative characters are often termed avatars, and users are increasingly spending considerable time, effort, thought and even resources on their avatars. A typical avatar has possessions, which are essentially virtual assets of the user. Such possessions may be purchased, gifted, and may be earned from gaming skill, longevity, and merit. Avatar possessions can include tools, costume items, performance boosting items, items conferring special powers upon use, vehicles, weapons, and virtual money.

The metaverse, and social and gaming virtual environments in general, are in many cases increasingly persistent and non-stop, some representing virtual worlds with clocks that never cease with users present as avatars or otherwise in all reality clock times and all world time zones. In some environments, the virtual possessions of a user, the avatar possessions, are not safe from theft or other adverse effects in the absence of attention of the user.

Improvements are needed in asset security in the multi-source virtual environment the internet is becoming.

BRIEF SUMMARY

Embodiments of the present invention address the above needs and/or achieve other advantages by providing apparatuses, systems, and methods that enable bidirectional user interaction in a graphically simulated environment.

In at least one embodiment, a system for secure packet recordation in multisource virtual environments, includes: a computing system including one or more processor and at least one of a memory device and a non-transitory storage device, wherein said one or more processor executes computer-readable instructions; and a network connection for operatively connecting the computing system to a first modeling server providing a first geometric model. Upon execution of the computer-readable instructions, the computing system performs steps including: upon user navigation action directed to the first modeling server, accessing at least a portion of the first geometric model; causing display, to a user, of a three dimensional virtual environment based on the accessed portion of the first geometric model; causing display, to the user, of an asset indicium representing a first virtual asset of the user in the three dimensional virtual environment; causing display, to the user, of a graphical representation of a secure packet in the three dimensional virtual environment; upon a deposit request by the user, receiving the first virtual asset into the secure packet; upon user navigation directed away from the first modeling server, terminating display, to the user, of the three dimensional virtual environment; and maintaining, in the absence of user attention, a content record of the secure packet, the content record including tabulation of at least the first virtual asset.

Causing display, to the user, of the asset indicium representing the first virtual asset of the user in the three dimensional virtual environment may include causing display of a user-controlled graphical indicium representative of the user in possession of the asset indicium.

The computing system may further performs steps including: upon further user navigation action directed to the first modeling server, causing display, to the user, of the three dimensional virtual environment; and upon a withdrawal request by the user, releasing the first virtual asset.

Before at least one of said receiving and said releasing, the computing system may further perform at least one step including authenticating the user.

Authenticating the user may include authenticating at least one of a password and biometric data.

Releasing at least one of the first virtual asset of the user and a second virtual asset of the user may include causing display, to the user, of the asset indicium representing the first virtual asset in contact with a user-controlled graphical indicium.

The first virtual asset may be specific to the three dimensional virtual environment based on the accessed portion of the first geometric model provided by the first modeling server.

In at least one embodiment, a system for secure packet recordation in multisource virtual environments includes: a computing system including one or more processor and at least one of a memory device and a non-transitory storage device, wherein said one or more processor executes computer-readable instructions; and a network connection for operatively connecting the computing system to multiple three dimensional virtual environments. Upon execution of the computer-readable instructions, the computing system performs steps including: causing display, to a user, of a first three dimensional virtual environment; causing display, to the user, of an asset indicium representing a first virtual asset of the user in the first three dimensional virtual environment; and upon at least a deposit request by the user, receiving the first virtual asset into a secure packet.

Causing display, to the user, of the asset indicium representing the first virtual asset of the user in the three dimensional virtual environment may include causing display of a user-controlled graphical indicium representative of the user in possession of the asset indicium.

Upon a withdrawal request by the user, the computing system may cause displaying the asset indicium returned to the user-controlled graphical indicium.

In at least one embodiment, a method is provided for a computing system to maintain a secure packet record in multisource virtual environments. The computing system includes one or more processor, at least one of a memory device and a non-transitory storage device, and a network connection for operatively connecting the one or more processor to at least one user-available device, the one or more processor configured to execute computer-readable instruction. The method including, upon execution of the computer-readable instructions: upon user navigation action directed to the first modeling server, accessing at least a portion of the first geometric model; causing display, to a user, of a three dimensional virtual environment based on the accessed portion of the first geometric model; causing display, to the user, of an asset indicium representing a first virtual asset of the user in the three dimensional virtual environment; causing display, to the user, of a graphical representation of a secure packet in the three dimensional virtual environment; upon a deposit request by the user, receiving the first virtual asset into the secure packet; upon user navigation directed away from the first modeling server, terminating display, to the user, of the three dimensional virtual environment; and maintaining, in the absence of user attention, a content record of the secure packet, the content record including tabulation of at least the first virtual asset.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Figure 1:
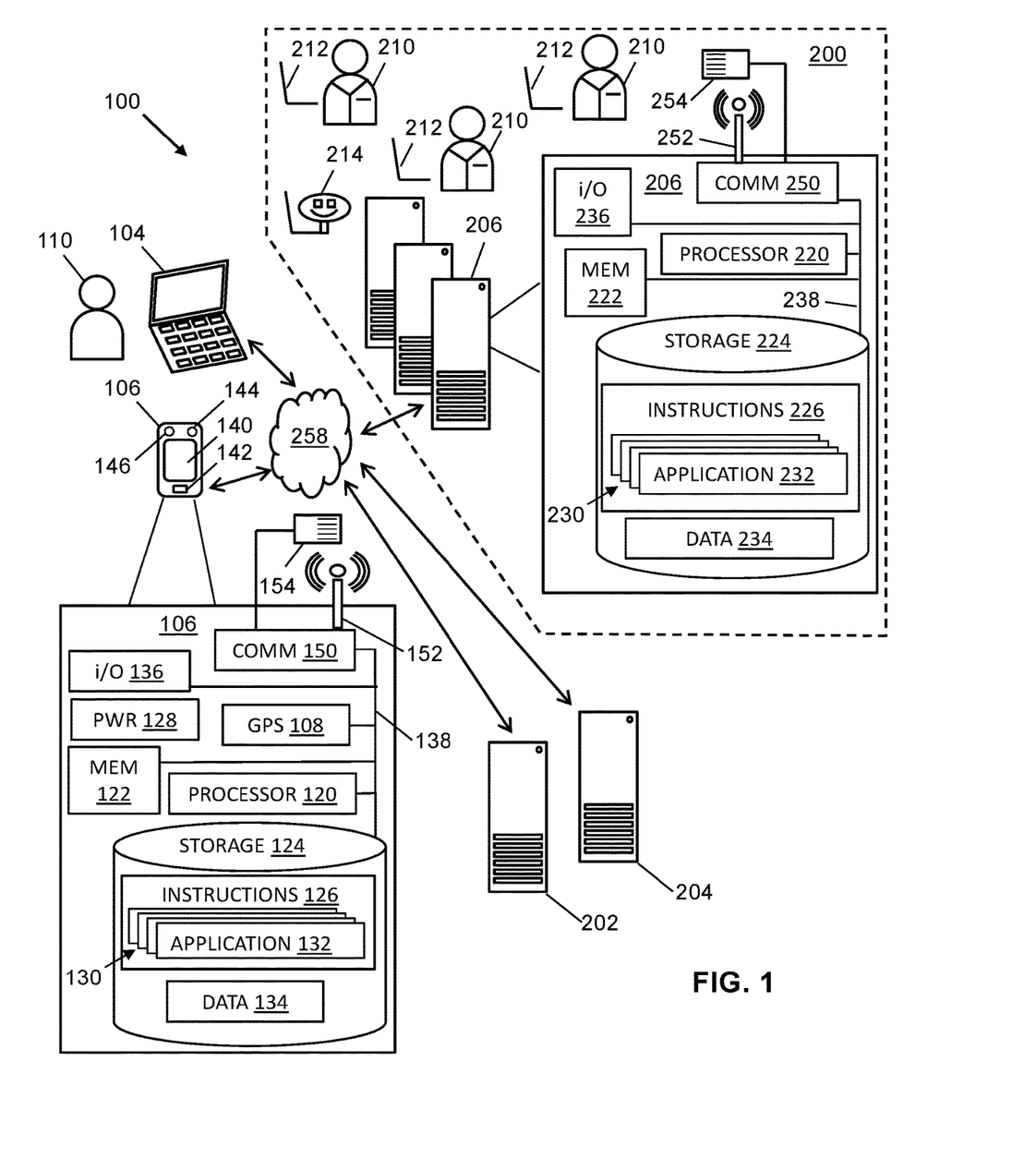
FIG. 1 illustrates an enterprise system and environment thereof for navigating context conversion in geometric modeling, in accordance with at least one embodiment of the present invention.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106, may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 106 and computing device 104, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2A:
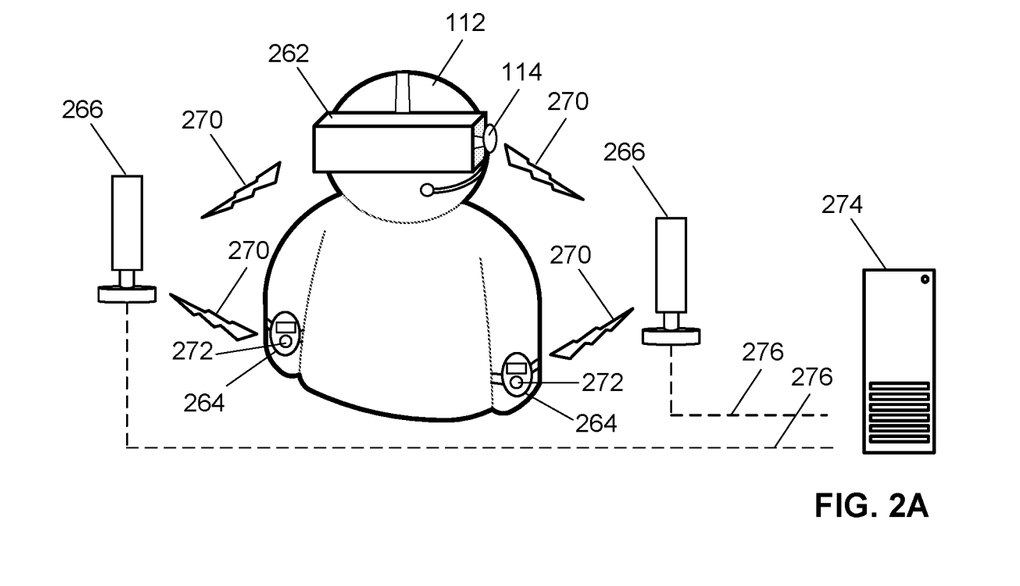
FIG. 2A illustrates equipment items, according to at least one embodiment, used in a virtual reality (VR) session.

The above-described systems and computing devices, in some embodiments, are used in whole or in part to implement virtual reality (VR) and/or augmented reality (AR) functioning. Virtual reality refers to a computer-generated simulation of a three-dimensional image or environment that can be interacted with in a seemingly real or physical way by a person using special electronic equipment, such as a visor or helmet with an internal screen, and gloves, handheld controller, and/or other effects fitted with sensors. A VR experience is typically immersive, offering the user a typically entirely artificial computer-generated environment. As vision of the real world around the user is occluded by a visor or helmet, a VR session typically occurs indoors and/or in a safe controlled environment for the safety of the user. VR equipment items are typically interactive devices represented in FIG. 2A as a visor or helmet 262, hand-held or mounted controllers 264, and sensors 266. Connections 270 in FIG. 2A represent interconnectivity among the visor or helmet 262, controllers 264, and sensors 266. The connections 270 may be wireless as represented in FIG. 2A and/or may include wired connections as well.

A microphone serving as input device for example for voice input by the participant 112, and a speaker or earphone serving as an output device to the participant, are referenced together in FIG. 2A as a headset 114 worn by the participant. A VR session in some instances includes bidirectional communication, for example among human participants conversing in real time with natural or modified voices. In other instances, a human participant 112 may communicate, for example in voice communication with a human agent 210, a virtual agent 214, or another use participating in a collaborative VR session.

VR applications immerse the user in a computer-generated environment (FIG. 2B) that simulates reality through the use of the interactive devices. The helmet or visor provides the user with a stereoscopic view 268 of animated images in the simulated environment. The illusion of "being there" (telepresence) is effected by motion sensors that pick up the user's movements to enable adjustment of the view provided the user in real time. Thus, a user can tour a simulated suite of rooms, experiencing changing viewpoints and perspectives that are convincingly related to their own head turnings and steps. The hand-held or mounted controllers 264 typically include buttons and/or triggers 272 by which user actions are relayed to the computing device or system 274 to effect user control of their simulated character and/or to implement user actions with the simulated environment. The hand-held or mounted controllers 264 can be equipped with force-feedback devices that provide the sensation of touch. The hand-held or mounted controllers 264 can be ergonomically formed for comfort and secure grasp in use.

Connections 276 in FIG. 2A represent interconnectivity between the sensors and/or other interactive devices with a computing device or system 274 by which calculations and other operation are conducted to dynamically produce the changing simulated environment in which user actions such as hand movements, head movements (looking up, down, left, and right), and user-positioning within a safe environment are typically all represented in the simulated environment. The connections 276 may be wired as represented in FIG. 2A and/or may be or include wireless connections as well. The computing device or system 274 may represent any of the user computing device 104, the mobile device 106, the computing system 206 of the enterprise system 200, and/or the external systems 202 and 204 (FIG. 1).

Figure 2B:
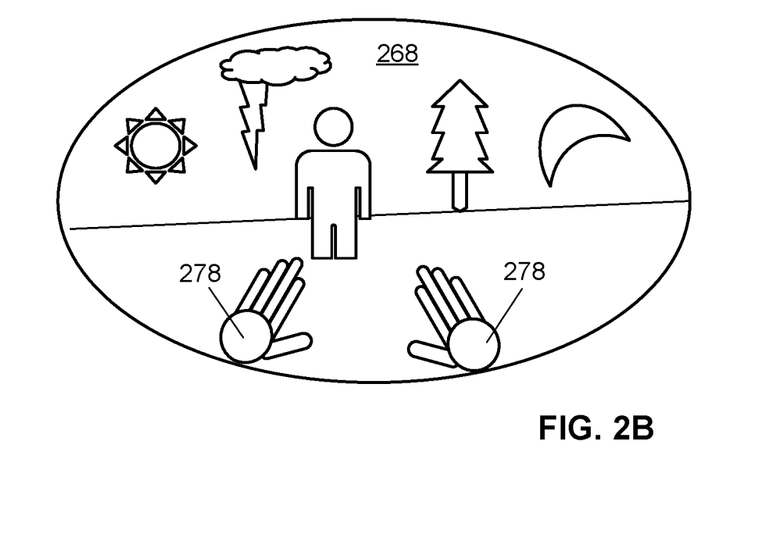
FIG. 2B shows a user view of a simulated environment in a VR session via a helmet or visor.

A visual VR session is illustrated in FIG. 2B. Audio information may be provided as well, for example via a headset 114, speakers within or mounted on the visor or helmet 262 or other nearby equipment items. A VR session can be used for gaming, viewing information, navigation, and many other uses. The user can, for example, pick up and manipulate objects that they see in the virtual environment. Visual confirmation of hand-held items and their manipulation can be presented to the user in the simulated environment via a simulated view of the hands, which may appear as character hands 278, such as robot, alien, athlete, soldier or other character hands. Indeed, a whole body or partial body representative of the user may be displayed in graphical form, such as an avatar or other graphical indicium under user control.

A typical user in a VR presentation as viewed for example by another participant is represented by a personalized and movable graphical indicium defining an avatar. These personalized user-representative and user-controlled graphical indicia can take different forms or shapes. A typical user deploys their customized graphical indicium, or avatar, as their representative presence in any given virtual world. Portions of such an avatar or other graphical indicium may be displayed to the user from virtual eye perspective according to body position. In some examples, a graphical indicium representing and/or controlled by the user can be as minimal as a cursor or other indicator. For example, a participant in a VR session may prefer a first person perspective, as through the eyes of their virtual character, such that minimal view of the virtual character's form may be seen by the participant. In other examples, a participant may prefer a floating or third-person perspective, in which case a more extensive view of the participant's virtual character, or avatar, may be seen.

Augmented reality (AR) refers to the integration of digital information with the user's environment in real time. Unlike virtual reality (VR), which creates a totally artificial environment, AR users experience a real-world environment with computer-generated perceptual information visually combined or overlaid on real world images. The computer-generated simulation of a three-dimensional image or environment can be interacted with in a seemingly real or physical way, typically using a mobile phone such as the user mobile device 106. Because an AR experience does not typically greatly occlude the user's view of their real environment, AR use is potentially more mobile and safer to use outdoors and/or in less controlled environments than VR. However, electronic equipment, such as the visor or helmet 262 (FIG. 2A) and hand-held or mounted controllers 264 may be used as well.

Figure 3A:
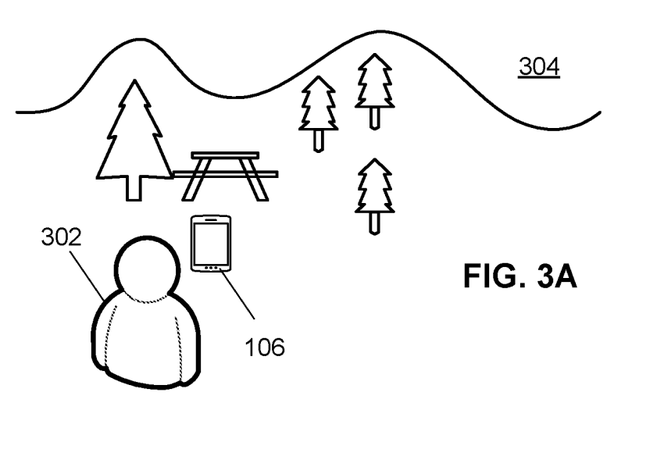
FIG. 3A illustrates an AR session in which a user views a background scene through an AR equipped mobile device.
Figure 3B:
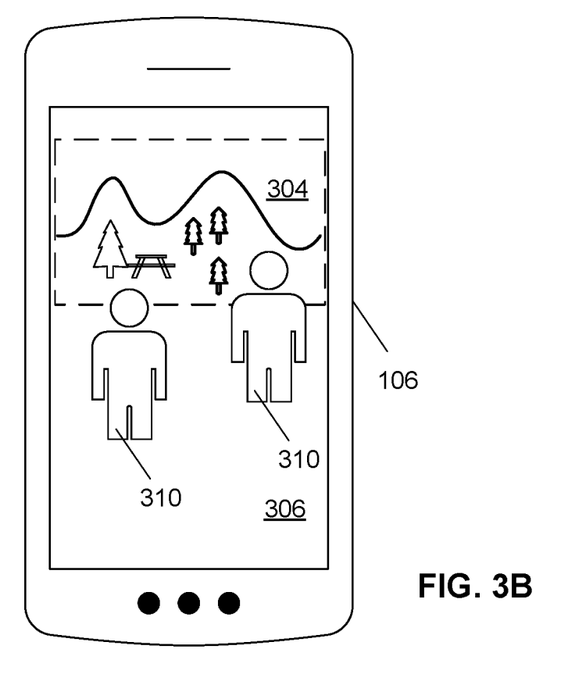
FIG. 3B shows the AR image on the mobile device.

FIG. 3A illustrates an AR session in which a user 302 views a background scene 304 through an AR equipped mobile device 106. FIG. 3B shows the AR image 310 on the mobile device 106. A visual AR session is illustrated. Audio information may be provided as well via speakers of the device 106. The AR image 306 includes characters 310 combined with or overlaid in the background scene 304. Any number of artificial characters and/or objects can be included. An AR session can be used for gaming, viewing information, navigation, and many other uses.

VR and AR experiences are increasingly available online and modern navigation of online content is expected to increasingly be navigated by these technologies, giving rise to the term metaverse. The metaverse 320 (FIG. 4) is essentially conceived as networked simulated digital environments permitting high user engagement with not only online services and content, but social connections as well. Persistent simulated virtual worlds have arrived, using blockchain technology in some instances to promote continuity and credibility. The metaverse is evolving as a multi-world space for online interaction facilitated by mobile internet as well as augmented reality and/or virtual reality equipped devices and gear.

Several types of sites have appeared. Their features are somewhat shared and somewhat differentiated. Although any given site may be considered as one or more of the below described types, some categorization is useful for understanding the current state and future of the metaverse.

Sites, domains, or platforms known as "walled gardens" tend to have controlled access, and tend to be event-based and hyper-realistic. A typical walled garden has centralized ownership and guideline governance, offers a tailor-made experience, and utilizes fiat currency. Non-limiting examples of walled gardens include Surreal, Zoan, Burst, Spatial, Hyperreal, and Omniya.

Online games are currently highly popular. They tend to have centrally-controlled governance, utilize private token currency, and offer a managed experience. Non-limiting examples of online games include Roblox, Axie Infinity, Fortnite, Minecraft, and Upland.

Sites, domains, or platforms known as "open lands" tend to have open access, and some are always on or persistently active. Decentralized governance and limited guidelines are attracting relative high investment relative to other platform types. Interoperability is also a relative characteristic of open lands, where non-fungible tokens (NFT) and cryptocurrencies such as stablecoins are used to manage and exchange ownership of assets. Non-limiting examples of open lands include Somnium Space, NFT Worlds, Substrata, Cryptovoxels, Decentraland, and Netvrk.

Figure 4:
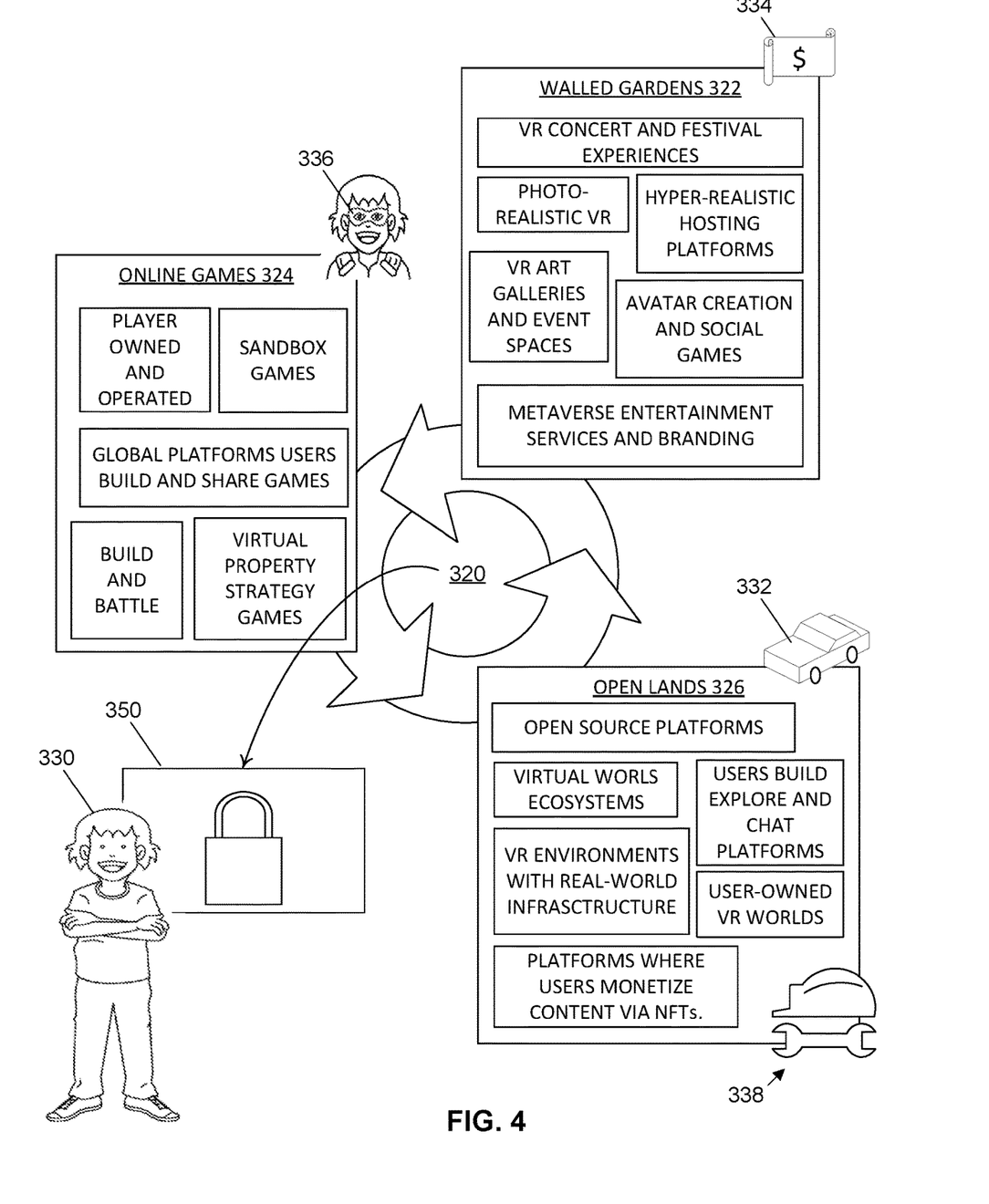
FIG. 4 shows organizational categories of graphical modeling content in which a secure packet according to inventive embodiments described herein can be provided.

Walled gardens 322, online games 324, and open lands 326 are represented as separate in FIG. 4, which also further provides examples of their uses and features. Any given site, domain, or platform can have characteristics of one or more of these and other types of sites, domains, or platforms, such that delineations between walled gardens, online games, and open lands, are not necessarily absolute or universally agreed upon. Hosting services at sites, domains, or platforms providing navigable virtual experiences are referenced and represented herein as modeling servers each providing a respective geometric model.

A typical user in the metaverse is represented by and controls a personalized and movable graphical indicium 330 defining an avatar. These personalized user-representative and user-controlled graphical indicia can take different forms or shapes. A typical user deploys their customized graphical indicium 330 as their representative presence in any given virtual world.

Like a user's physical form, a customized graphical indicium 330 may have many outward appearances by use of accessories amounting to virtual clothing, costumes, and gear. Continuity of a customized graphical indicium, for example by which users recognize each other in their shared virtual experiences, is provided by a base form, in correspondence for example to a human body. For descriptive purpose, the underlying base form of a customized graphical indicium 330 is referenced herein as an object frame. Like a physical body, an object frame can be endowed with humanoid on animal-like attributes, like lower and upper torsos, operable limbs, and faces capable of exhibiting non-verbal cues. In a typical deployment, a customized graphical indicium 330 may include user-selected graphical accessories overlaying the object frame like clothing or other layers. In some cases, the graphical accessories are virtually operable as well, as in the case of tools, weapons, armor, and other items, all representing assets of the user.

Ownership and attributes of a customized graphical indicia, the object frame thereof, and the accessories thereof, may be recorded and safe-guarded via NFT security. User assets such as funds (virtual money), for example carried and/or represented by a virtual wallet, may be similarly protected. A non-fungible token (NFT) is generally a record on a blockchain associated with a particular asset, which can be digital, virtual, or physical. Ownership of an NFT is recorded in the blockchain, and can be transferred, allowing NFTs to be sold and traded. In some instances, assets may be in the form of, or may be transacted via, stablecoins, which are cryptocurrencies where the price is indexed to a reference asset. The reference asset may be fiat money, exchange-traded commodities, or a cryptocurrency.

As in the physical world, a user can own items. For example, possessions can be accumulated in many online virtual environments. These virtual assets can include tools, costume items, performance boosting items, items conferring special powers upon use, vehicles, weapons, and virtual money. Virtual assets are in many instances world specific in the metaverse, having meaningful context in one virtual environment, but not another. For example, as represented by respective asset indicia in FIG. 4, vehicles, currency, and costume items may be specific to certain environments and are accordingly used by the user via their avatar or other graphical indicium, which may also vary from environment to environment. Accordingly, a first asset indicium 332 shown for illustration as a vehicle, a second asset indicium 334 shown for illustration as a currency, a third asset indicium 336 shown for illustration as a costume, and other indicia 338 shown for illustration as a protective item and a tool, are provided as non-limiting examples representing corresponding virtual assets of the user in association with respective sites, domains, or platforms in FIG. 4.

Figure 5:
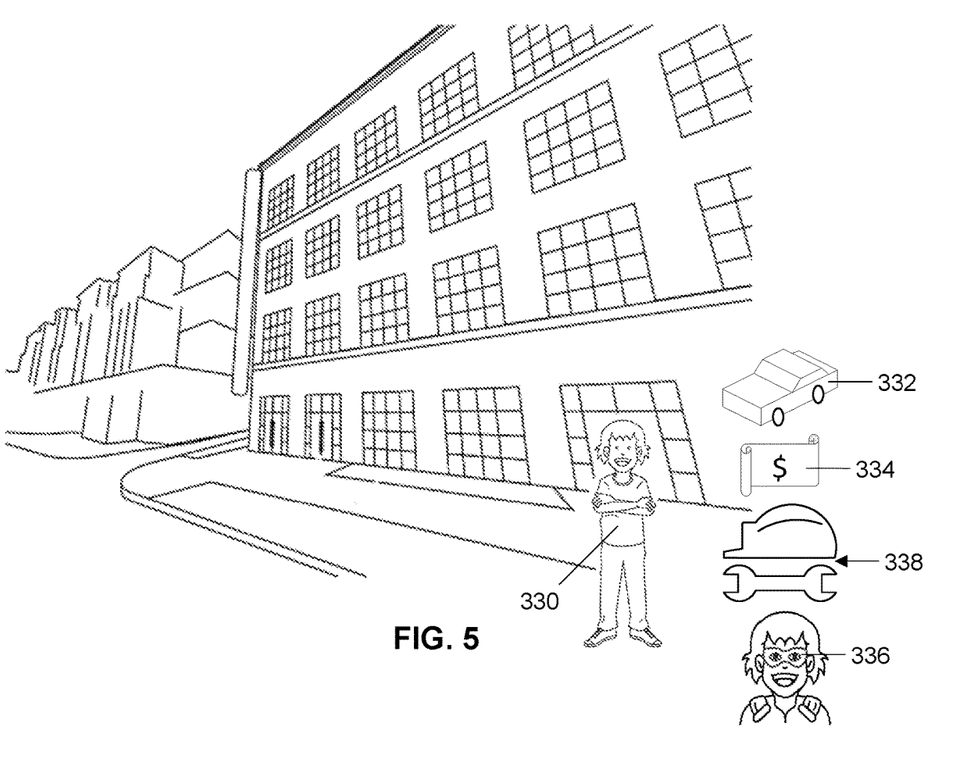
FIG. 5 shows a display, for example in a VR presentation, of virtual assets of a user, the user represented by an avatar, in a virtual environment.

As represented in FIG. 5, possession of virtual assets can be graphically represented in a virtual environment, shown for example, as an urban landscape in FIG. 5. For example, possession can be indicated by proximity or contact with a user's movable graphical indicium 330 or avatar, or in table, menu, or list form. Costume effects and tools for example, can be represented as in use by illustration of the particular item donned upon or in the grasp of the movable graphical indicium as appropriate for the item.

While virtual assets may be persistent in an environment in the absence of user attention, what a user virtually possesses in any particular environment can change. Other users and non-player characters (NPCs) can take, damage, move or otherwise affect virtual assets. A user may establish a location for storing items, for example in a virtual structure such as a house or garage, but such an arrangement may be insecure and unprotected, particularly when the user leaves the area, logs off, navigates online to another environment, or is otherwise inattentive.

To provide for improved security of virtual assets, a system for secure packet recordation in multisource virtual environments is provided in inventive systems and methods according to these descriptions. A digital locker, or lock box, serves as a secure packet in which virtual assets can be received and maintained. The secure packet 350 can be graphically represented as in FIG. 4, or other visual form. A user can in essence keep items in the secure packet 350 and the stored items are secure from tampering or theft by other users and NPCs. When the user is inattentive, such as by logging off or navigating away to another location or virtual environment, items received in the secure packet are maintained, for example by way of maintaining, in the absence of user attention, a content record 360 of the secure packet 350, the content record including tabulation of the secured virtual assets. Other users, in some examples, are prevented from accessing the received and stored virtual assets, the content record, and the secure packet.

Figure 6:
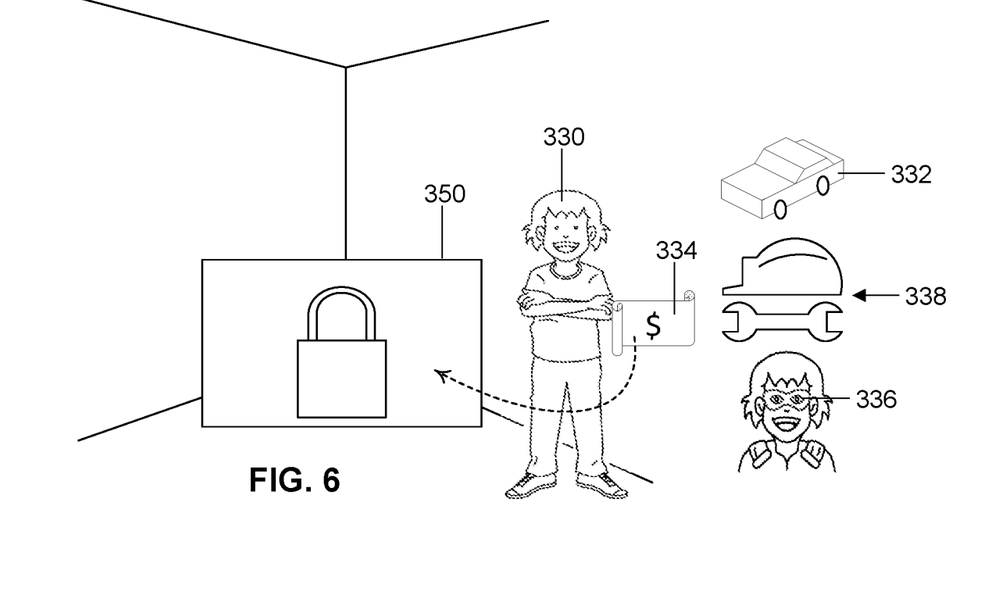
FIG. 6 shows a display of a graphical representation of a secure packet, according to at least one embodiment, for receiving and securing virtual assets of the user, each represented by a respective asset indicium.

The secure packet 350, in some examples, is placed in a virtual world in a particular location. In some examples, another entity, for example termed the first entity and/or enterprise entity herein, may provide the secure packet 350 in, for example, in a branch location as represented in FIG.

6. In other examples, the secure packet 350 can be provided at user-selected locations. Use of the secure packet may be permitted to a subscriber or client of the providing entity for a fee or other arrangement. The providing entity can be a hosting entity of a modeling server providing a geometric model upon which a three dimensional environment is based for navigation by a user 110 and/or participant 112. Alternatively, the providing entity can enter into an arrangement with such a hosting entity to provide, license, or effect the secure packet 350. The providing entity can have arrangements with multiple hosting entities of respective modeling servers each providing a respective geometric model upon which a respective user-navigable three dimensional virtual environment is based. In this latter non-limiting example, a user 110 and/or participant 112 benefits from familiar presence and use of the secure packet 350 in a multisource environment, such as the internet and/or metaverse.

Accordingly, in various embodiments and for at least one example, the system 200 provides secure packet recordation in multisource virtual environments. The computing system 206, the at least one of a memory device 222 and non-transitory storage device 224, and the one or more processor (220,120) implement various examples by which a user interacts with and at least partially controls a user-representative and user-controlled graphical indicium 330, shown in the drawings as a human-form avatar in appearance as a non-limiting example. The network connection 258 operatively connects, in some examples, the computing system 200 to multiple modeling servers, for example as represented by the external systems 202 and 204 in FIG. 1. Each of the modeling servers can provide a respective geometric model, each of which can be accessed at least in part and represented to the user as a three a three dimensional virtual environment.

Upon user navigation action directed to the first modeling server, such as by logging onto or entering a corresponding website provided or hosted by the first modeling server, the user accesses at least a portion of the first geometric model, causing display, to the user, of a three dimensional virtual environment based on the accessed portion of the first geometric model. The can user control movement of an avatar to navigate the displayed three dimensional virtual environment, for example by use of the controllers 264 (FIG. 2A) or other user-operable navigation buttons or controls, being physical or virtual, and being local on a user device or accessible to the user via a connected session to the computing system 200 or the external system 202. Other user actions such as deposit requests and withdrawal requests with regard to use of the secure packet, can also be submitted and/or controlled by use of the controllers 264 (FIG. 2A) or other user-operable navigation buttons or controls, being physical or virtual, and being local on a user device or accessible to the user via a connected session to the computing system 200 or the external system 202. Display, displaying, causing to display, causing display, and similar terms in these descriptions with reference to FIGS. 4-7 describe at least VR presentations to a user as in FIGS. 2A-2B, AR presentations to a user as in FIGS. 3A-3B, and other displayed presentation types.

In the example of FIG. 6, a graphical representation of a secure packet 350 in the three dimensional virtual environment is displayed to the user. Asset indicia representing virtual assets of the user are displayed in the three dimensional virtual environment for selection to be received into and taken from the secure packet 350. Upon a deposit request by the user, a selected virtual asset is received into the secure packet 350. A virtual asset received in the secure packet is locked from use and secure. Received and thereby locked, a virtual asset is not accessible for unauthorized use, tampering, moving, and/or theft. A virtual asset received and locked from use in some embodiments of the secure packet refers to preventing use, tampering, moving, and theft by other users, and in some embodiment refers to preventing same by the user owner or depositor of the virtual asset prior to reacquisition by withdrawal request and release of the virtual asset.

Figure 7:
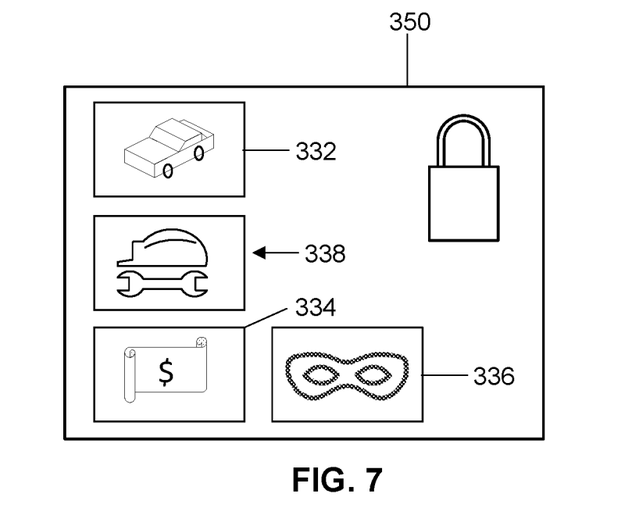
FIG. 7 shows a content record of a secure packet, the content record including a graphical tabulation of secured virtual assets.

Upon user navigation directed away from the first modeling server, such as by logging off or otherwise browsing away from the session, display of the three dimensional virtual environment to the user is terminated, for example as the user explores another virtual environment or browses other online content. A content record 360 of the secure packet 350 is maintained, even in the absence of user attention. The content record includes tabulation of virtual assets received therein. The tabulation can be graphical as represented in FIG. 7 by way of respective asset indicia as contained in the graphical representation of the secure packet, or the tabulation can be represented in list, menu, or other graphical or textual form. The virtual assets of the user are thus protected by use of the secure packet.

After a virtual asset is received in the secure packet 350, the user can later reacquire the asset. Upon a withdrawal requests submitted or otherwise caused by the user, the virtual asset is released, referring to unlocking and returning the virtual asset for available use to the authorized user. The display of the virtual environment may be correspondingly updated to show possession. In graphical context, releasing the virtual asset refers to returning the asset indicium corresponding to the virtual asset to the user-controlled graphical indicium of the authorized user.

The user can thus deposit and retrieve and use items when desired. For example, the user may deposit items in the secure packet in a particular virtual environment, and then logoff and/or navigate away from the corresponding modeling server to browse the content provided by other servers. Then upon return to the particular virtual environment, the user may withdraw selected items from the secure packet. In some examples, where interoperability and/or context permits, users may deposit one or more items in one virtual environment provided by one modeling server and entity, and then withdraw such one or more items in another virtual environment provided by another modeling server and entity.

To assure security of virtual assets and prevent unauthorized access, authentication can be required to access the secure packet 350. For example, receipt of a security measure may be required before a virtual asset can be received or withdrawn from the secure packet. Security measures required can include requirement of a username and a password. Other security measures may be required, such as a pattern entry, a numeric code, biometric data such as thumb print or impression data, facial recognition, and others. Usernames, passwords, patterns, codes, and biometric data can be collected from the user, for example, by interactive devices represented in FIG. 1 as user devices 104 and 106, in FIG. 2A as a visor or helmet 262, and as headset 114 for example by use of voice recognition, and as handheld or mounted controllers 264, and sensors 266.

The user may be represented by a personalized and movable graphical indicium 330. In the illustrated example, the graphical indicium 330 is represented as an avatar in whole body view, as seen for example by an observer or in third-person perspective. In practice in a VR presentation for example, portions of such an avatar may be displayed to the user, for example as arms and other body parts as viewed from virtual eye perspective according to body position. A graphical indicium representing and/or controlled by the user can be as minimal as a cursor or other indicator.

The secure packet can appear as a box, a locker, a safe, a folder, a cabinet, a vault, or any other representation. The secure packet and/or its location can be displayed as a virtual kiosk or other marker. A consistent representative graphical form may be advantageous by serving to identify the secure packet in one or more virtual environment, permitting users to recognize access locations and navigate their customized graphical indicia defining their avatars to such access locations for use of the functions available at the secure packet.

The secure packet 350 can be displayed in a virtual environment with further virtual signage or a marker further facilitating familiarity for locating and accessing the secure packet by a user. A marker can further include or be graphically represented as, in whole or in part, a virtual service office location, appearing as a branch office, for examples where the first entity provides financial services and operates as a financial institution. To maintain control and ownership by the first entity or other controlling party, the secure packet may be or correspond to a non-fungible token (NFT).

The security of virtual assets is thus enabled by the above-described systems, devices, and methods expressed or implied, in inventive implementations of a secure packet and its use. The above advantages and features can be implemented in various system and device hardware examples, and can also be practiced as one or more methods, which are at least expressed by implication with the above described systems, and by which bidirectional user interaction in a graphically simulated environment is provided in keeping with the above descriptions. Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for secure packet recordation in multisource virtual environments, the system comprising:
    a computing system including one or more processor and at least one of a memory device and a non-transitory storage device, wherein said one or more processor executes computer-readable instructions; and
    a network connection for operatively connecting the computing system to a first modeling server providing a first geometric model;
    wherein, upon execution of the computer-readable instructions, the computing system performs steps comprising:
    upon user navigation action directed to the first modeling server, accessing at least a portion of the first geometric model;
    causing display, to a user, of a three dimensional virtual environment based on the accessed portion of the first geometric model;
    causing display, to the user, of an asset indicium representing a first virtual asset of the user in the three dimensional virtual environment;
    causing display, to the user, of a graphical representation of a secure packet in the three dimensional virtual environment;
    upon a deposit request by the user, receiving the first virtual asset into the secure packet;
    upon user navigation directed away from the first modeling server, terminating display, to the user, of the three dimensional virtual environment; and
    maintaining, in the absence of user attention, a content record of the secure packet, the content record including tabulation of at least the first virtual asset.

2. The system according to claim 1, wherein causing display, to the user, of the asset indicium representing the first virtual asset of the user in the three dimensional virtual environment comprises causing display of a user-controlled graphical indicium representative of the user in possession of the asset indicium.

3. The system according to claim 1, wherein, upon execution of the computer-readable instructions, the computing system performs steps comprising:
    upon further user navigation action directed to the first modeling server, causing display, to the user, of the three dimensional virtual environment; and
    upon a withdrawal request by the user, releasing the first virtual asset.

4. The system according to claim 3, wherein before at least one of said receiving and said releasing, the computing system performs at least one step comprising authenticating the user.

5. The system according to claim 3, wherein authenticating the user comprises authenticating at least one of a password and biometric data.

6. The system according to claim 3, wherein releasing at least one of the first virtual asset of the user and a second virtual asset of the user comprises causing display, to the user, of the asset indicium representing the first virtual asset in contact with a user-controlled graphical indicium.

7. The system according to claim 3, wherein the first virtual asset is specific to the three dimensional virtual environment based on the accessed portion of the first geometric model provided by the first modeling server.

8. A system for secure packet recordation in multisource virtual environments, the system comprising:
    a computing system including one or more processor and at least one of a memory device and a non-transitory storage device, wherein said one or more processor executes computer-readable instructions; and
    a network connection for operatively connecting the computing system to multiple three dimensional virtual environments;
    wherein, upon execution of the computer-readable instructions, the computing system performs steps comprising:
    causing display, to a user, of a first three dimensional virtual environment;
    causing display, to the user, of an asset indicium representing a first virtual asset of the user in the first three dimensional virtual environment; and
    upon at least a deposit request by the user, receiving the first virtual asset into a secure packet.

9. The system according to claim 8, wherein causing display, to the user, of the asset indicium representing the first virtual asset of the user in the three dimensional virtual environment comprises causing display of a user-controlled graphical indicium representative of the user in possession of the asset indicium.

10. The system according to claim 9, upon a withdrawal request by the user, the computing system causes displaying the asset indicium returned to the user-controlled graphical indicium.

11. The system according to claim 9, wherein before at least one of said receiving the first virtual asset into a secure packet and said displaying the asset indicium returned to the user-controlled graphical indicium, the computing system performs at least one step comprising authenticating the user.

12. The system according to claim 11, wherein authenticating the user comprises authenticating at least one of a password and biometric data.

13. The system according to claim 8, wherein the first virtual asset is specific to the first three dimensional virtual environment.

14. A method for a computing system to maintain a secure packet record in multisource virtual environments, the computing system including one or more processor, at least one of a memory device and a non-transitory storage device, and a network connection for operatively connecting the one or more processor to at least one user device, the one or more processor configured to execute computer-readable instructions, the method comprising, upon execution of the computer-readable instructions:

upon user navigation action directed to the first modeling server, accessing at least a portion of the first geometric model;

causing display, to a user, of a three dimensional virtual environment based on the accessed portion of the first geometric model;

causing display, to the user, of an asset indicium representing a first virtual asset of the user in the three dimensional virtual environment;

causing display, to the user, of a graphical representation of a secure packet in the three dimensional virtual environment;

upon a deposit request by the user, receiving the first virtual asset into the secure packet;

upon user navigation directed away from the first modeling server, terminating display, to the user, of the three dimensional virtual environment; and maintaining, in the absence of user attention, a content record of the secure packet, the content record including tabulation of at least the first virtual asset.

15. The method according to claim 14, wherein causing display, to the user, of the asset indicium representing the first virtual asset of the user in the three dimensional virtual environment comprises causing display of a user-controlled graphical indicium representative of the user in possession of the asset indicium.

16. The method according to claim 14, further comprising:

upon further user navigation action directed to the first modeling server, causing display, to the user, of the three dimensional virtual environment; and upon a withdrawal request by the user, releasing the first virtual asset.

17. The method according to claim 16, the method further comprising, before at least one of said receiving and said releasing, authenticating the user.

18. The method according to claim 17, wherein authenticating the user comprises authenticating at least one of a password and biometric data.

19. The method according to claim 16, wherein releasing at least one of the first virtual asset of the user and a second virtual asset of the user comprises causing display, to the user, of the asset indicium representing the first virtual asset in contact with a user-controlled graphical indicium.

20. The method according to claim 16, wherein the first virtual asset is specific to the three dimensional virtual environment based on the accessed portion of the first geometric model provided by the first modeling server.

* * * * *